(12) United States Patent
Ho et al.

(10) Patent No.: US 10,927,676 B2
(45) Date of Patent: Feb. 23, 2021

(54) ROTOR DISK FOR GAS TURBINE ENGINE

(71) Applicant: PRATT & WHITNEY CANADA CORP., Longueuil (CA)

(72) Inventors: Eric Ho, Markham (CA); Jamal Zeinalov, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 88 days.

(21) Appl. No.: 16/267,935

(22) Filed: Feb. 5, 2019

(65) Prior Publication Data
US 2020/0248554 A1 Aug. 6, 2020

(51) Int. Cl.
*F01D 5/02* (2006.01)
*F04D 29/28* (2006.01)
*F04D 29/32* (2006.01)

(52) U.S. Cl.
CPC ............ *F01D 5/02* (2013.01); *F04D 29/284* (2013.01); *F04D 29/321* (2013.01); *F04D 29/329* (2013.01); *F05D 2220/32* (2013.01); *F05D 2240/24* (2013.01); *F05D 2250/291* (2013.01)

(58) Field of Classification Search
CPC ........ F01D 5/02; F04D 29/284; F04D 29/321; F04D 29/329; F05D 2250/291
See application file for complete search history.

(56) References Cited

U.S. PATENT DOCUMENTS

| 4,447,188 A * | 5/1984 | Davis ................ F01D 5/028 415/115 |
| 4,759,688 A * | 7/1988 | Wright ............... F01D 5/087 415/115 |
| 4,787,821 A | 11/1988 | Cruse et al. |
| 5,961,287 A * | 10/1999 | Cairo ..................... F01D 5/02 416/97 R |
| 6,499,953 B1 | 12/2002 | Bellerose et al. |
| 7,559,745 B2 | 7/2009 | Falk et al. |
| 8,920,128 B2 | 12/2014 | Matwey et al. |
| 9,033,670 B2 * | 5/2015 | Mittendorf ............. F01D 5/147 416/213 R |
| 9,476,305 B2 * | 10/2016 | Jan ......................... F01D 5/081 |
| 2016/0047245 A1 | 2/2016 | Abrari et al. |
| 2018/0112531 A1 | 4/2018 | Abrari |

FOREIGN PATENT DOCUMENTS

| CN | 103967837 A | 8/2014 |
| CN | 105298911 B | 11/2017 |

OTHER PUBLICATIONS

English translation of patent document No. CN 103967837 dated Aug. 6, 2014, https://patents.google.com/patent/CN103967837A/en?oq=cn+103967837, accessed on Feb. 12, 2019.
English translation of patent document No. CN 105298911 dated Nov. 24, 2017, https://patents.google.com/patent/CN105298911B/en?oq=cn105298911B, accessed on Feb. 12, 2019.

* cited by examiner

*Primary Examiner* — Ninh H. Nguyen
(74) *Attorney, Agent, or Firm* — Norton Rose Fulbright Canada LLP

(57) ABSTRACT

A gas turbine engine rotor disk has a single-piece hub with a radially-outer surface, and with an annular cavity inside the single-piece hub. The annular cavity is defined by a radially-elongated cross-sectional profile revolved at least partly about the axis of rotation. Blades extend outwardly from the radially-outer surface.

16 Claims, 3 Drawing Sheets

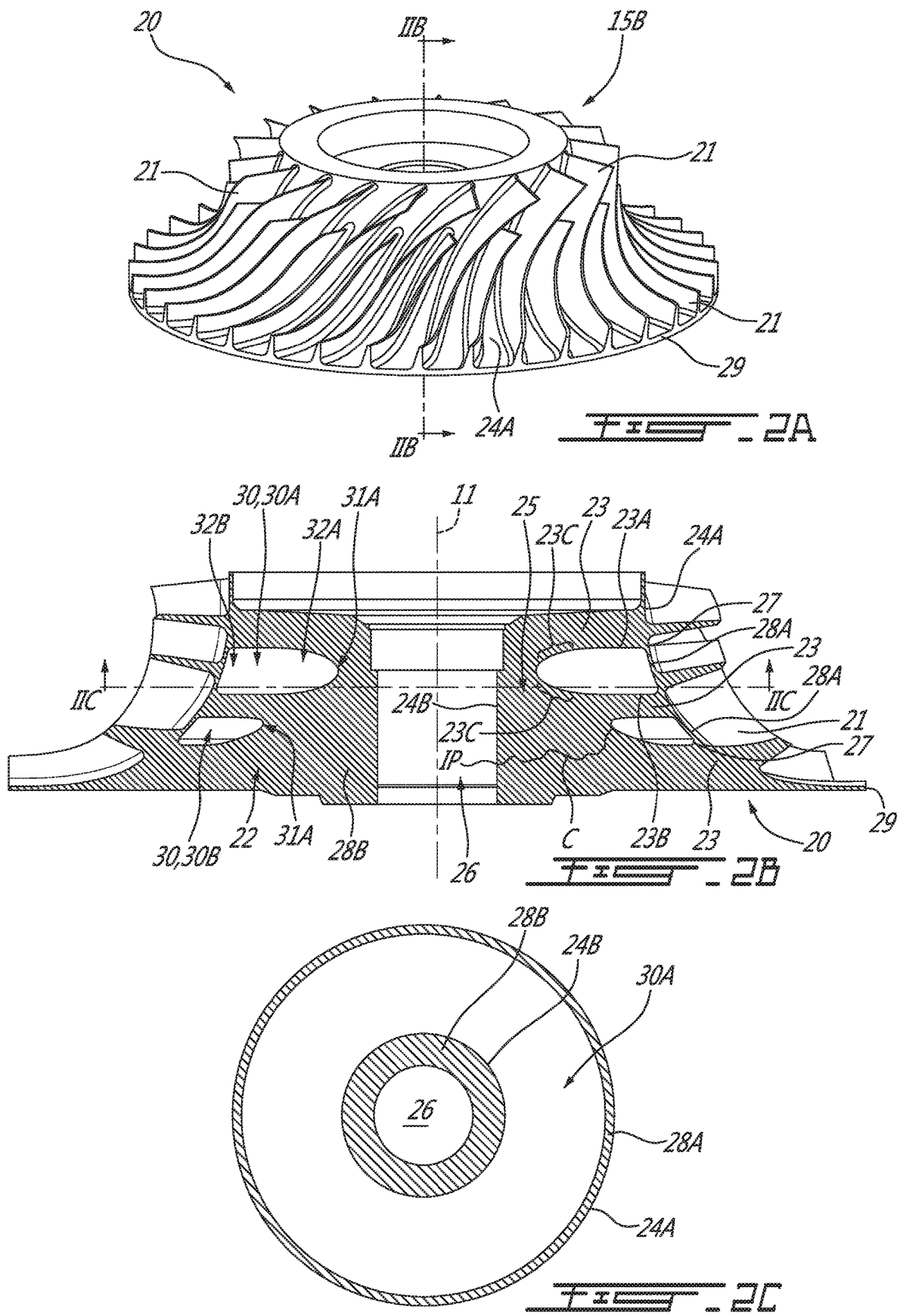

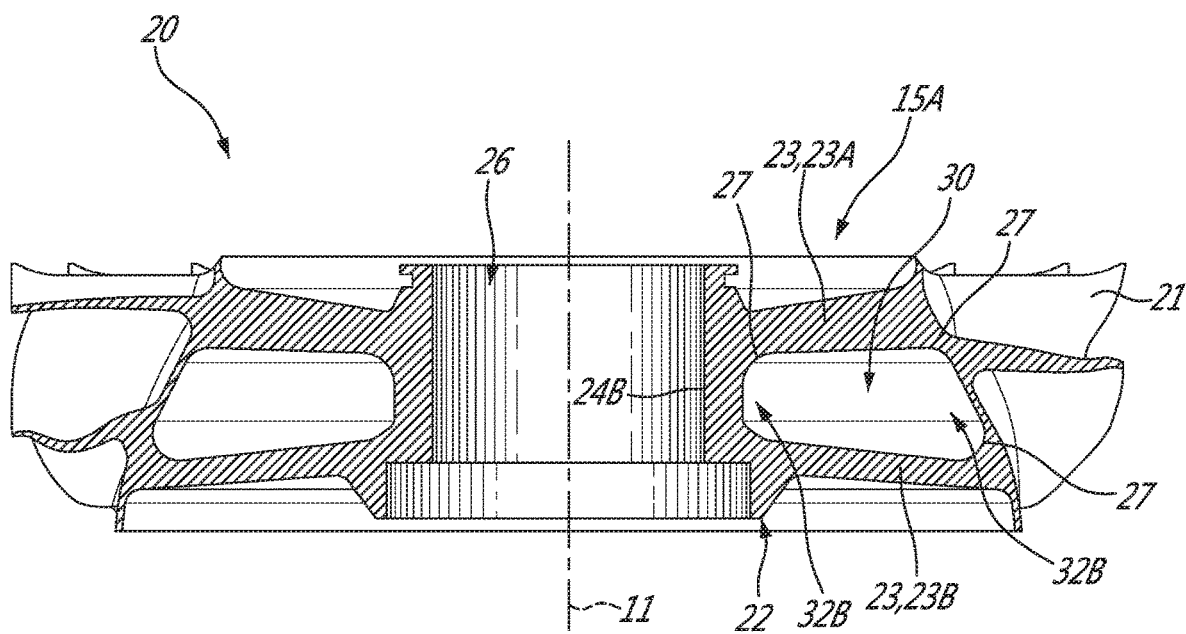

ROTOR DISK FOR GAS TURBINE ENGINE

TECHNICAL FIELD

The application relates generally to gas turbine engines and, more particularly, to rotor disks for gas turbine engines.

BACKGROUND

In gas turbine engines, the compressor and turbine stages have rotating disks with blades, which are connected to a central shaft. The disks are typically designed to withstand the centrifugal and aerodynamics loads generated during operation of the gas turbine engine, and are also often designed to reduce the deflection of the rotating blades.

The design of gas turbine engines must take into consideration and mitigate the effects of failure cases such as crack initiation in rotor disks and the propagation of such crack(s). A crack propagating throughout the rotor disk could cause significant disk fragmentation, and create massive components which must be contained. To account for potential disk fragmentation, containment structures are positioned around the disk. These containment structures must be sufficiently strong to contain disk fragmentation, and may therefore incur a weight penalty.

SUMMARY

In one aspect, there is provided a gas turbine engine rotor disk, comprising: a single-piece hub having an axis of rotation, a radially-outer surface, and an annular cavity inside the single-piece hub, the annular cavity being defined by a radially-elongated cross-sectional profile revolved at least partly about the axis of rotation; and blades extending outwardly from the radially-outer surface of the single-piece hub.

There is also provided a gas turbine engine, comprising: a shaft having an axis of rotation; and a rotor disk, comprising: a single-piece hub with a shaft bore to receive the shaft, a radially-outer surface, and an annular cavity inside the single-piece hub, the annular cavity being defined by a radially-elongated cross-sectional profile revolved at least partly about the axis of rotation, the annular cavity being disposed between axially spaced apart webs of the single-piece hub; and blades extending outwardly from the radially-outer surface of the single-piece hub.

DESCRIPTION OF THE DRAWINGS

Reference is now made to the accompanying figures in which:

FIG. 2A is a perspective view of a rotor disk of the gas turbine engine of FIG. 1;

FIG. 2B is a cross-sectional view of the rotor disk of FIG. 2A, taken along the line IIB-IIB in FIG. 2A;

FIG. 2C is another cross-sectional view of a hub of the rotor disk of FIG. 2A, taken along the line IIC-IIC in FIG. 2B; and FIG. 3 is a cross-sectional view of another rotor disk of the gas turbine engine of FIG. 1, taken along the line III-III in FIG. 1.

DETAILED DESCRIPTION

Figure 1:
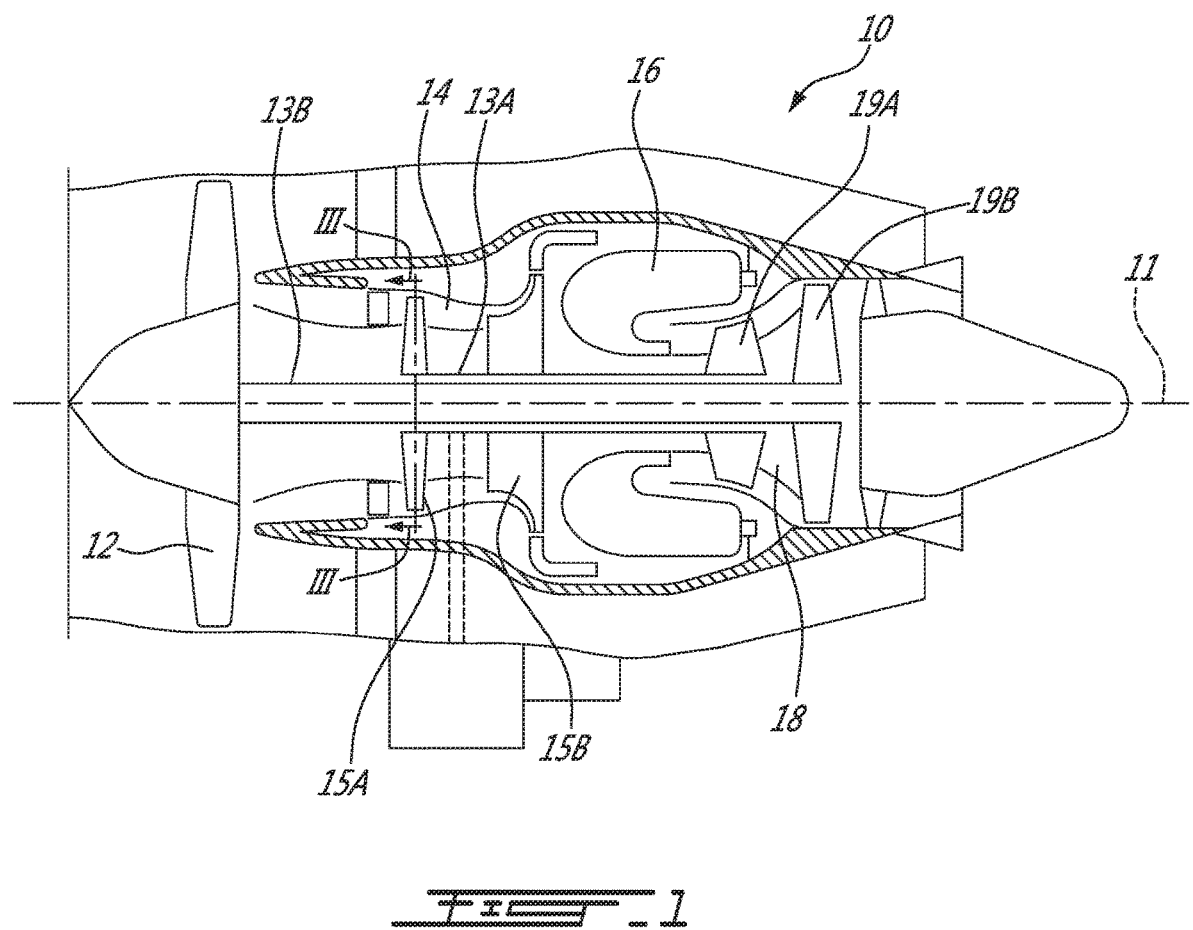
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor and turbine sections 14,18 have rotatable components. The compressor section 14 has an axial compressor 15A for pressurizing the air which is then conveyed to a downstream centrifugal compressor, or impeller 15B. The turbine section 18 has a high pressure (HP) turbine 19A, and a downstream low pressure or power turbine 19B which drives the fan 12. One or all of the axial compressor 15A, the HP turbine 19A, and the power turbine 19B may have multiple stages. The axial compressor 15A, the impeller 15B and the HP turbine 19A are mechanically linked by a first shaft 13A. The fan 12 and the power turbine 19B are mechanically linked by a second shaft 13B. The rotatable components of the compressor and turbine sections 14,18 rotate about a central axis of rotation 11 of the gas turbine engine 10.

FIGS. 2A to 2C show a first example of a rotor disk 20 which can be adapted to the gas turbine engine 10. The illustrated rotor disk 20 is the impeller 15B. The features and functions ascribed to the rotor disk 20 herein may also be present in other types of rotor disks 20 or rotary gas turbine engine components, including the following non-limiting examples: the fan 12, a component of the compressor section 14, and a component of the turbine section 18 (e.g. the HP turbine 19A, and the power turbine 19B), to name but a few examples. Indeed, another type of rotor disk 20, the axial compressor 15A, is described in greater detail below.

The rotor disk 20 has a single-piece hub 22 which generally has a solid of revolution shape centered around the axis of rotation 11. The single-piece hub 22 forms a corpus of the rotor disk 20 and provides structure thereto. The single-piece hub 22 (sometimes referred to herein simply as "hub 22") is a one-piece component, and is integrally formed throughout its extent. The hub 22 has a unitary construction. For example, in some embodiments, hub 22 is manufactured as a single piece instead of comprising an assembly of two or more components. The integrality or unity of the hub 22 can be achieved during its manufacture. For example, hub 22 and optionally also blades 21, may be made by casting or additive manufacturing using suitable (e.g., metallic) material(s). In some embodiments, hub 22 and blades 21 can be manufactured as a single component by casting or additive manufacturing. In some embodiments, rotor disk 20 may undergo one or more finishing operations (e.g., grinding, machining) to achieve the desired dimensional accuracy after casting or additive manufacturing.

In the depicted embodiment, the hub 22 has an optional bore 26 being coaxial with the axis of rotation 11 to receive the first shaft 13A therein. In an alternate embodiment, the single-piece hub 22 is filled or solid along its central axial portion, and is free of a central aperture or bore. The hub 22 has a contoured radially-outer surface 24A and a radially-inner surface 24B defining bore 26. The radially-outer surface 24A is further from the axis of rotation 11 than the radially-inner surface 24B along a radial direction that is transverse to the axis of rotation 11. In the depicted embodiment, the radially-outer surface 24A is the surface of the hub 22 that is exposed to air flow. In the depicted embodiment, the radially-outer surface 24A is the radially-outermost surface of the hub 22, it being the surface of the hub 22 that is farthest from the axis of rotation 11. The radially-inner surface 24B defines the bore 26, and is the radially-innermost surface of the hub 22, it being the surface of the hub 22 that is closest to the axis of rotation 11.

A plurality of blades 21 extend outwardly from the radially-outer surface 24A of the single-piece hub 22. The blades 21 have a radial dimension, an axial dimension, and may also have a tangential or circumferential dimension. The blades 21 may be integral with the hub 22 to form a single bladed disk (or "blisk"), or the blades 21 may be attached to the hub 22. The rotor disk 20 in the depicted embodiment is in the form of the centrifugal impeller 15B, and thus the blades 21 are impeller blades. In various embodiments, the blades 21 may be other types of blades 21 (e.g. blades 21 for the fan 12, blades 21 for the axial compressor 15A, blades for the HP turbine 18A or for the power turbine 18B, etc.).

Referring to FIGS. 2B and 2C, the hub 22 has one or more annular cavities 30. The cavities 30 may be hollow and contribute to reducing the weight of the hub 22, and thus of the rotor disk 20. The cavities 30 also help mitigate the damage that could be caused by the propagation of one or more cracks through the hub 22, as explained in greater detail below.

The cavities 30 are annular in shape. The cavities 30 are defined by a radially-elongated cross-sectional profile revolved at least partly about the axis of rotation 11. By "radially-elongated", it is understood that the radial dimension of the cavities 30 is greater than the axial dimension of the cavities 30. In the depicted embodiment, the cavities 30 are defined by their radially-elongated cross-sectional profiles revolved completely about the axis of rotation 11. The cavities 30 are thus circumferentially uninterrupted, and thus form circumferentially uninterrupted annuli being co-axial with the axis of rotation 11. Each of the cavities 30 lies entirely within a single plane being normal to the axis of rotation 11. In an alternate embodiment, one or more of the cavities 30 is defined by its radially-elongated cross-sectional profile revolved only partly about the axis of rotation 11, i.e. less than 360° about the axis of rotation 11.

The cavities 30 are radially delimited by radially-outer and radially-inner portions of the hub 22, and are axially delimited by axially-spaced apart portions of the hub 22. In the depicted embodiment, each cavity 30 is delimited at a radially-outer portion thereof by a relatively thin skin segment 28A of the hub 22 which defines part of the radially-outer surface 24A, and is delimited at radially-inner portion thereof by a radially-inner portion 28B of the hub 22 which defines part of the radially-inner surface 24A. The radially-inner portion 28B of the hub 22 has a greater radial dimension than the skin segment 28A of the hub 22. The thickness of the skin segment 28A is greater than or equal to a thickness of the back plate 29 of the hub 22. The thickness of the back plate 29 is thus related to the radial extent or dimension of the cavities 30.

The cavities 30 can be empty internal voids or holes in the hub 22 which are disposed entirely within the hub 22. In the depicted embodiment, each cavity 30 is delimited by internal walls of the hub 22. In the depicted embodiment, each cavity 30 is spaced radially inwardly from the radially-outer surface 24A, and spaced radially outwardly from the radially-inner surface 24B. The cavities 30 are thus closed cavities. The cavities 30 form circumferential pockets within the hub 22. The annular cavities 30 are spaced radially outwardly from the bore 26, and extend radially outwardly in a direction away from the bore 26. In the depicted embodiment, the cavities 30 are delimited and enclosed entirely on all sides by portions of the single-piece hub 22. No portion of the cavities 30 is delimited by a component which is separate from the single-piece hub 22 and which may be attached thereto. The cavities 30 may be formed as part of the single-piece hub 22 of the rotor disk 20 using any suitable technique such as casting and additive manufacturing.

Referring to FIG. 2B, the annular cavities 30 are disposed between axially spaced apart webs 23 of the single-piece hub 22. The webs 23 are radially-elongated portions of the hub 22 that extend in the depicted embodiment radially-inwardly from the radially-outer surface 24A of the hub 22. Each web 23 includes a portion of the radially-outer surface 24A. The webs 23 have a radial dimension which is larger than their axial dimension. The webs 23 are annular in shape, and are axially spaced apart. The webs 23 are circumferentially continuous solid bodies. Axially-adjacent webs 23 are separated from each other by one of the cavities 30. In the depicted embodiment, the webs 23 are continuous with the radially-inner portion 28B of the hub 22, and extend radially-outwardly therefrom. In the depicted embodiment, the webs 23 are spaced radially outwardly from the bore 26, and extend radially outwardly in a direction away from the bore 26. The webs 23 thus form toroidal-shaped structures of the single-piece hub 22 of the rotor disk 20. The webs 23 define corners 27 delimiting part of the cavities 30. The corners 27 are rounded to reduce stress concentration.

Referring to FIGS. 2A to 2C, the depicted rotor disk 20 may help better distribute throughout the rotor disk 20 the centrifugal and aerodynamic loads generated during operation of the gas turbine engine 10. The presence of the cavities 30 may also reduce the weight of the rotor disk 20.

The cavities 30 and associated webs 23 may also change the failure mode of the rotor disk 20. The axial spacing apart of some of the structures of the single-piece hub 22 may result in a single crack propagation leading to reduced fouling of components of the blades 21 on the surrounding containment structure, instead of a more significant rupture of the rotor disk 20 that could otherwise occur with other rotor disk designs. The reduced risk of massive rupture or "burst" of the rotor disk 20 may allow for reducing the containment requirement in the event of disk failure, and thus may allow for reducing the complexity and/or weight of the containment structures around the rotor disk 20.

The single-piece hub 22 may therefore be designed to mitigate the propagation of a crack which may form therein. Referring to FIGS. 2B and 2C, the hub 22 has a central region. The central region 25 is a portion of the hub 22 along which a crack may initiate and propagate through the hub 22. It is understood that cracks typically propagate in a radially-outward direction due to loading generated during operation of the rotor disk 20. Crack propagation may occur very quickly and in some cases almost instantaneously, in contrast to other material failure modes like creep.

In the depicted embodiment, the central region 25 is defined between the radially-inner surface 24B of the hub 22 and radially-inner ends 31A of the cavities 30. In the depicted embodiment, the central region 25 includes the radially-inner portion 28B of the hub 22. The central region 25 has a radial dimension or extent less than a radial distance between the radially-inner surface 24B and the radially-outer surface 24A of the single-piece hub 22. The central region 25 is thus an annular portion or volume of the hub 22. It will be appreciated that the central region 25 may take other shapes or forms than that shown, depending on the number and shape of the cavities 30, for example.

The number and shape of the cavities 30 and the webs 23 may be selected to reduce the potential for crack formation and mitigate the effects of crack propagation through the hub 22. Consider the following description of the possible formation and propagation of a crack through the hub 22, which is given for illustrative purposes only, it being understood that cracks may form and propagate differently than as described. Referring to FIG. 2B, an exemplary crack C forms at an initiation point IP along the radially-inner surface 24B of the hub 22 due to loads acting on the rotor disk 20. The crack C may propagate radially outwardly from the initiation point IP through the central region 25. The crack C may encounter one of the cavities 30 at the radially-inner end 31A thereof. The crack C may then be prevented from propagating further after encountering the cavity 30, and may thus lead to the fragmentation of only a relatively small portion of the hub 22 compared to a disk design having no cavities.

The cavities 30 therefore help reduce the likelihood of the crack C propagating through the entire hub 22. Additional energy would be needed for the crack C to further propagate once it reaches one of the cavities 30, which contributes to improving the containment requirement, and thus may allow for reducing the weight of the containment structures. The webs 23 contribute to dividing the hub 22 into axially-spaced apart internal hub segments. If the crack C develops in one of the webs 23, it is unlikely to propagate through all of the webs 23 before failure occurs, thus contributing to the containment requirement.

The presence of the cavities 30 and webs 23 provide some control over crack propagation so that any fragmentation of the rotor disk 20 would result in smaller potential fragment size compared to a solid hub without the cavities. It is understood that the problem of crack propagation can be more important in a single-piece hub than in a multi-piece hub, because in multi-piece hubs disk fragmentation may more predictably occur along the partition lines of the pieces of the hub.

The cavities 30 and associated webs 23 may have any suitable shape, or be of any suitable number, to facilitate the mitigation of crack propagation described above, and examples of possible shapes are described with reference to FIGS. 2B and 2C.

For example, each of the webs 23 has first surface 23A and an axially-spaced apart second surface 23B. The first and second surfaces 23A,23B partially delimit the axial extent of the cavities 30. At least part of the first and second surfaces 23A,23B have curved segments 23C with a curvature. The curved segments 23C are concave. One or more of the webs 23 have a radially-elongated cross-sectional profile. The cross-sectional profile of some of the webs 23 tapers in a direction toward the radially-outer surface 24A of the hub 22. The cross-sectional profile of some of the webs 23 thus decreases in axial dimension in a radially-outward direction, such that the axial dimension at a radially outer end of the webs 23 is less than that at the radially inner end. It may be possible to design the path of propagation of the crack C along one of the webs 23. This confinement of the crack C may also help to reduce the size of a disk fragment and improve containment because the crack C may cause the fragmentation of only that portion of the hub 22 where the web 23 is located, and thus not a larger or more massive part of the rotor disk 20.

For example, the annular cavities 30 may have a radial dimension, measured along a radial line from the axis of rotation 11 at a given axial position that is between 5% and 95% of a radial dimension of the hub 22 measured between the radially-inner surface 24B and the radially-outer surface 24A at the same axial position. The radial extent of the cavity 30 may be selected as a function of the lifing or stress requirements of the rotor disk 20 (i.e. how long the rotor disk 20 is expected to function for). Each of the annular cavities 30 has a radially-inner portion 32A and a radially-outer portion 32B. The radially-outer portion 32B has a first axial dimension measured in a direction parallel to the axis of rotation 11 that is greater than a second axial dimension of the radially-inner portion 32A. Each of the cavities 30 in the depicted embodiment therefore has a greater axial extent closer to the radially-outer surface 24A than the axial extent closer to the radially-inner surface 24B of the hub 22. This shape of the cavities 30 may help to optimize stress distribution through the hub 22.

The hub 22 in the depicted embodiment has a first annular cavity 30A and a second annular cavity 30B inside the single-piece hub 22. The first and second annular cavities are axially-spaced apart, and axially separated by one of the webs 23. FIG. 2B shows three webs 23. The first annular cavity 30A has a first volume and the second annular cavity 30B has a second volume different from the first volume. The first volume is greater than the second volume. The first and second cavities 30A, 30B have different sizes in the depicted embodiment. The first cavity 30A is larger than the second cavity 30B. The radial dimension or extent of the first cavity 30A is greater than the radial dimension or extent of the second cavity 30B. A structure for the hub 22 with two to three webs 23 may help to better distribute centrifugal stress and decrease the strain on the blades 21. The number of cavities 30 may be related to the ability of the hub 22 to resist or arrest crack propagation. For example, it may be possible to further control crack propagation by increasing the number of cavities 30.

Another rotor disk 20 of the gas turbine engine 10 is the axial compressor 15A, shown more clearly in cross-section in FIG. 3. The hub 22 in FIG. 3 includes only one annular cavity 30. The radially-outer portion 32B of the cavity 30 has a first axial dimension measured in a direction parallel to the axis of rotation 11 that is greater than a second axial dimension of the radially-inner portion 32A. The hub 22 has two annular webs 23. A first web 23A thickens, or increases in axial dimension, in a radially-outward direction from the axis of rotation 11. The second web 23B tapers, or decreases in axial dimension, in a radially-outward direction from the axis of rotation 11. The description above of the features and functions of the rotor disk 20 in the form of the impeller 15B applies mutatis mutandis to the rotor disk 20 shown in FIG. 3 in the form of the axial compressor 15A.

There is also disclosed a method of forming the rotor disk 20. The method includes providing the single-piece hub 22 and blades 21. The method also includes forming one or more annular cavities 30 extending radially through the single-piece hub 22 to define the webs 23. Providing the single-piece hub 22 may include making the single-piece hub 22 by casting or additive manufacturing using powder bed fusion technology. The cavities 30 may be formed simultaneously with the single-piece hub 22. Forming the one or more cavities 30 may include selecting a number of the cavities 30 as a function of structural requirements of hub 22 and desired effect over propagation of the crack C through the single-piece hub 22. As explained above, the number and/or configuration of cavities 30 may be related to the ability of the hub 22 to resist or arrest crack propagation.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine rotor disk, comprising:
   a single-piece hub having an axis of rotation, a radially-outer surface, and an annular cavity inside the single-piece hub, the annular cavity being defined by a radially-elongated cross-sectional profile revolved at least partly about the axis of rotation; and
   blades extending outwardly from the radially-outer surface of the single-piece hub,
   wherein:
      the annular cavity is a first annular cavity;
      the single-piece hub has a second annular cavity inside the single-piece hub;
      the first and second annular cavities are axially-spaced apart; and
      the single-piece hub has a web having a radially-elongated cross-sectional profile disposed between the first and second annular cavities.

2. The gas turbine engine rotor disk of claim 1, wherein:
   the single-piece hub has a shaft bore defining a radially-inner surface of the single-piece hub;
   the web is a first web;
   the single-piece hub has a second web having a radially-elongated cross-sectional profile; and
   the first and second webs are spaced apart axially by the first annular cavity.

3. The gas turbine engine rotor disk of claim 1, wherein the web is one of two webs having radially-elongated cross-sectional profiles and spaced apart axially by the first annular cavity, the webs each have a first surface and an axially-spaced apart second surface, the first and second surfaces having a concave curvature along a length thereof.

4. The gas turbine engine rotor disk of claim 1, wherein the web is one of two webs spaced apart axially by the first annular cavity, the two webs each have a radially-elongated cross-sectional profile tapering toward a radially-outer end thereof.

5. The gas turbine engine rotor disk of claim 1, wherein the first annular cavity has a radially-inner portion and a radially-outer portion, the radially-outer portion having a first axial dimension greater than a second axial dimension of the radially-inner portion.

6. The gas turbine engine rotor disk of claim 1, wherein the first annular cavity has a first volume and the second annular cavity has a second volume different from the first volume.

7. The gas turbine engine rotor disk of claim 1, wherein the rotor disk is an axial compressor.

8. The gas turbine engine rotor disk of claim 1, wherein the rotor disk is a centrifugal impeller.

9. A gas turbine engine, comprising:
   a shaft having an axis of rotation; and
   a rotor disk, comprising:
      a single-piece hub with a shaft bore to receive the shaft, a radially-outer surface, and an annular cavity inside the single-piece hub, the annular cavity being defined by a radially-elongated cross-sectional profile revolved at least partly about the axis of rotation, the annular cavity being disposed between axially spaced apart webs of the single-piece hub; and
      blades extending outwardly from the radially-outer surface of the single-piece hub,
   wherein:
      the annular cavity is a first annular cavity;
      the single-piece hub has a second annular cavity inside the single-piece hub;
      the first and second annular cavities are axially-spaced apart; and
      a first of the webs has a radially-elongated cross-sectional profile disposed between the first and second annular cavities.

10. The gas turbine engine of claim 9, wherein:
    the shaft bore defines a radially-inner surface of the single-piece hub; and
    the webs each have a radially-elongated cross-sectional profile.

11. The gas turbine engine of claim 9, wherein:
    the webs each have a radially-elongated cross-sectional profile; and
    the webs each have a first surface and an axially-spaced apart second surface; and
    the first and second surfaces have a concave curvature along a length thereof.

12. The gas turbine engine of claim 9, wherein the webs each have a radially-elongated cross-sectional profile tapering toward a radially-outer end thereof.

13. The gas turbine engine of claim 9, wherein the first annular cavity has a radially-inner portion and a radially-outer portion, the radially-outer portion having a first axial dimension greater than a second axial dimension of the radially-inner portion.

14. The gas turbine engine of claim 9, wherein the first annular cavity has a first volume and the second annular cavity has a second volume different from the first volume.

15. The gas turbine engine of claim 9, wherein the rotor disk is an axial compressor.

16. The gas turbine engine of claim 9, wherein the rotor disk is a centrifugal impeller.

* * * * *